United States Patent [19]

Osnas

[11] Patent Number: 4,733,689
[45] Date of Patent: Mar. 29, 1988

[54] FLUID PRESSURE ACTIVATED VALVE

[76] Inventor: Lee Osnas, 8853 S. Fowler, Fowler, Calif. 93623

[21] Appl. No.: 904,601

[22] Filed: Sep. 8, 1986

[51] Int. Cl.$^4$ ............................................. F16K 31/12
[52] U.S. Cl. ...................................... 137/494; 251/147
[58] Field of Search ......................... 137/624.18, 624.2; 251/147, 61; 137/494

[56] References Cited

U.S. PATENT DOCUMENTS

| | | | |
|---|---|---|---|
| 2,712,428 | 7/1955 | Forwald | 251/147 X |
| 2,828,765 | 4/1958 | Hilkmeier | 251/147 X |
| 2,896,661 | 7/1959 | Becker | 251/147 X |
| 4,442,861 | 4/1984 | Hahs | 251/61 |

Primary Examiner—Alan Cohan
Attorney, Agent, or Firm—Worrel & Worrel

[57] ABSTRACT

A valve for use with irrigation systems. The valve is fluid pressure actuated and includes a two part movable upper valve body portion which seals about the mouth of a pipe. A pedestal is threadably secured to the pipe and guides the movable valve body. The valve body is biased against the pipe by a spring connected to the pedestal.

13 Claims, 7 Drawing Figures

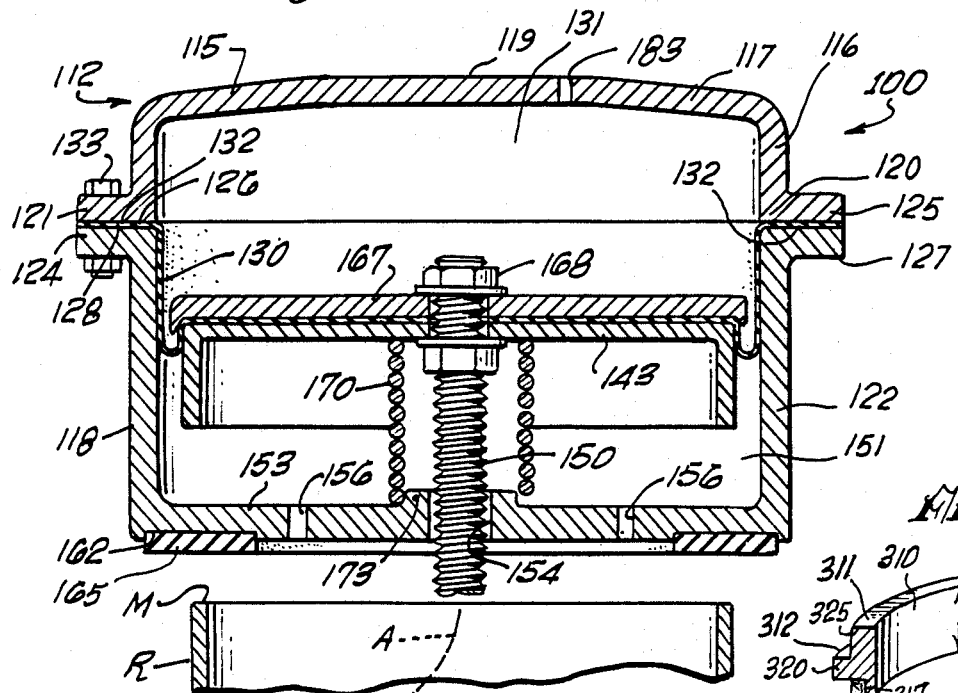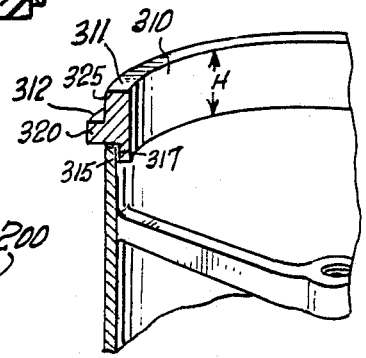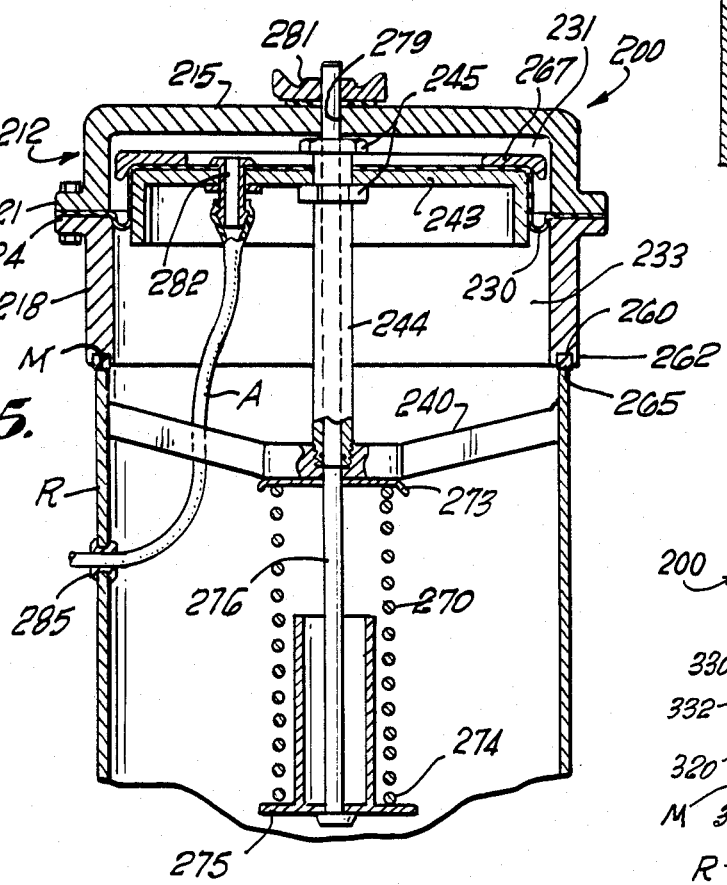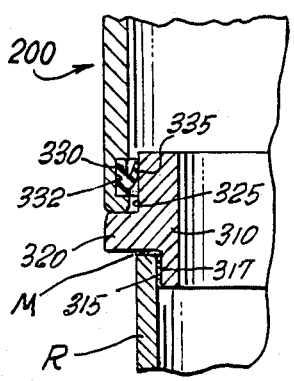

FLUID PRESSURE ACTIVATED VALVE

The present invention relates to fluid flow control valves, and more particularly, to adjustable fluid motivated control valves having particular, although not exclusive, use in conjunction with both flood and surge type irrigation systems.

BACKGROUND OF THE INVENTION

1. Field of the Invention

From the Sacramento Valley southward through California and throughout the southwest and in parts of the southern regions and plains states, natural rain fall has typically been inadequate to permit efficient reclamation and use of the indigenous arid soils for agricultural purposes. These lands were reclaimed and made productive through the development of elaborate, although somewhat rudimentary, irrigation systems.

Water sources vary, depending on location, and include storage reservoirs, canals, natural water courses and, of course, subterranean alluvial flow, which is retrieved by the use of expensive pumps.

The cost of water, of course, is dear and while years of research, much of which is at the university level, has taught the farmer "how much" water each crop should receive, given the parameters of soil conditions, evapotransportation rate and the type of crop itself, efficient delivery of water to the farmer's field in the proper amounts continues to be, in many parts of the country, an essentially manual task. Probably the most common approach is referred to as flood irrigation, most vividly conceptualized by the rice farmer. In such cases, the field to be irrigated is typically leveled so as to provide a modest decrease in elevation from the water source to the portion of the field most remote from the water source where the remaining water is collected and disposed of. The field is provided with small dikes and water from the source is permitted to flood the field and "soak in". The typical consequences which result from employing such a method is that a certain amount of runoff, or residual water hereinafter referred to as "tail water", is produced which must be disposed of by draining it away from the field. That water may be lost to the farmer, resulting in a certain amount of waste.

A more modern approach is the surge irrigation approach. Its proponents indicate that this method of irrigation possesses numerous advantages such as faster water distribution, increased uniformity in application, a reduction in the initial pumping costs, and a reduction in tail water losses, all of which are true, to a greater or lesser extent, depending upon the particular application.

2. Description of the Prior Art

The prior art is replete with numerous examples of assorted irrigation devices which have been designed for particular irrigation applications. Examples include drip and sprinkler irrigation techniques which are discussed in the reference to Pollock, U.S. Pat. No. 4,317,539 and in the reference to Bently, U.S. Pat. No. 3,974,853, both of which are employed most frequently with respect to certain trees and vines.

Whether a flood or surge method of irrigation is employed, the prevalent prior art practice of transporting water to the fields includes three major techniques. The first technique entails simply cutting a dike between a source of ditch water and the field so as to permit uncontrolled flow of the ditch water into the field.

The second technique employs syphon tubes which are disposed in fluid-flow relation between the source of ditch water and the field. Common to row crop applications, the syphon tube irrigation method is employed to draw water out of the ditch and into the fields without cutting the dike. As should be understood, this method requires that one or more individuals actually walk to the field, prime the syphon tubes, and then put them in position such that they are operable to draw water from the ditch and deliver it to the field. Thereafter, and once the requisite amount of water has been applied, these same individuals must come back and break the syphon and remove the syphon tubes to prevent further water flow.

The third technique utilizes conduits which are filled with water from a pressure source, such as a pump, or where water is delivered to a standpipe connected to the conduit. The standpipe, when used, is of a predetermined height which will support heads, which may range from two to thirty feet. The heads, of course, permit the water to be delivered through the conduit system to risers in the field. Each of the risers is equipped with a manually operated gate or like valve arrangement, which must be manually opened and closed. The overflow riser valve apparatus manufactured by Waterman Industries, Inc. is an example of such a device. In certain other row crop irrigation systems, lengths of gated pipe are mated in fluid-flow relation with larger valves, the device being adapted selectively to feed a predetermined number of furrows simultaneously.

While the prior art practices operate with varying degrees of success, they have numerous shortcomings which have detracted from their usefulness. The most obvious drawbacks to the various systems previously described include the inability of the previous methods adequately to control the volume of water applied, the inability to apply that water uniformly over the surface area of the field, the creation of an unacceptable amount of tail water and power usage, and a huge expenditure of labor with the coincident expense thereof.

The value of automating irrigation systems to some extent is recognized in the prior art. More particularly the reference to H. R. Haise et al., U.S. Pat. No. 3,320,750 discloses the use of inflatable bladders to restrict irrigation flow. Similarly, the reference to Mitchell, U.S. Pat. No. 1,873,138 recognizes the use of rubber bladders in a general purpose valve arrangement. As a general proposition, it has been recognized that automation of commercial irrigation systems provides certain significant benefits, and that the use of fluid pressure actuated valves in particular, has some utility. With the advent of computer automation, remotely operable subassemblies have taken on a new importance.

Notwithstanding the teachings heretofore discussed, neither the state of the prior art as practiced at the time of the present invention, nor other prior art efforts to devise suitable irrigation controls, either anticipate the means, nor achieve the same laudable results, capable of being achieved by use of the present invention.

SUMMARY OF THE INVENTION

The valve of the present invention is uniquely capable of being affixed directly to the mouth of a riser to which irrigation water under predetermined pressure may be fed. The valve, is disposed in a normally closed first position, against irrigation water pressure and is held there by resilient means such as by utilizing a biasing spring. The valve of the present invention is rendered operative by the introduction of a low pressure actuating fluid, such as air, which is sufficient to overcome the force exerted by the biasing spring and thus to open the riser. The valve of the subject invention may further be controlled so as to open, by a predetermined amount, thereby permitting water flow therefrom at a predetermined rate for a desired period of time. In this way uniformity of water distribution over the surface of the field and volume of irrigation water supplied are simultaneously controlled.

The valve of the present invention is adapted to operate at fluid pressures which range from eight to thirty pounds per square inch (psi). The fluid pressures are maintained at this low level because of the relatively large area against which the fluid pressure acts to overcome the force of the biasing spring. The biasing spring force required to keep the valve of the instant invention seated and sealed against the irrigation water pressure is relatively small because of the minimal movable surface area against which the water pressure acts. Moreover, the valve of the present invention is constructed in such a fashion as to produce a very low amount of friction during operation, thereby becoming substantially maintenance free and thus acquiring a high degree of reliability. Furthermore, by maintaining the valve in a normally closed first position, the instant invention prevents the entry and the accumulation of dirt and other contaminants in the irrigation system, from external sources, when the irrigation system is not operating.

Finally, the valve of the present invention is adapted to be accurately field calibrated to provide a predetermined amount of valve lift, and, thus an opening of predetermined dimension thereby producing a substantially constant flow rate of volume per unit of the time during each irrigation cycle.

All of the foregoing salutary benefits can be achieved with the expenditure of an absolute minimum of manual labor, resulting in an exceptional savings to the user.

BRIEF DESCRIPTION OF THE DRAWINGS

Having briefly summarized the background of the invention and its beneficial aspects, a preferred embodiment and several alternate forms will hereinafter be described in conjunction with the accompanying drawings.

FIGS. 4 and 5 are partial longitudinal sectional views of second and third forms of the instant invention. The valve of FIG. 4 is shown in its open position and the valve of FIG. 5 is shown in its closed position.

FIG. 6 is a partial sectional view, and illustrating a novel sleeve arrangement which can be affixed to the mouth of a typical irrigation riser.

FIG. 7 is a partial longitudinal sectional view which illustrates the use of a lip seal in conjunction with the sleeve of FIG. 6.

DESCRIPTION OF THE PREFERRED EMBODIMENT

First Form

Figure 1:
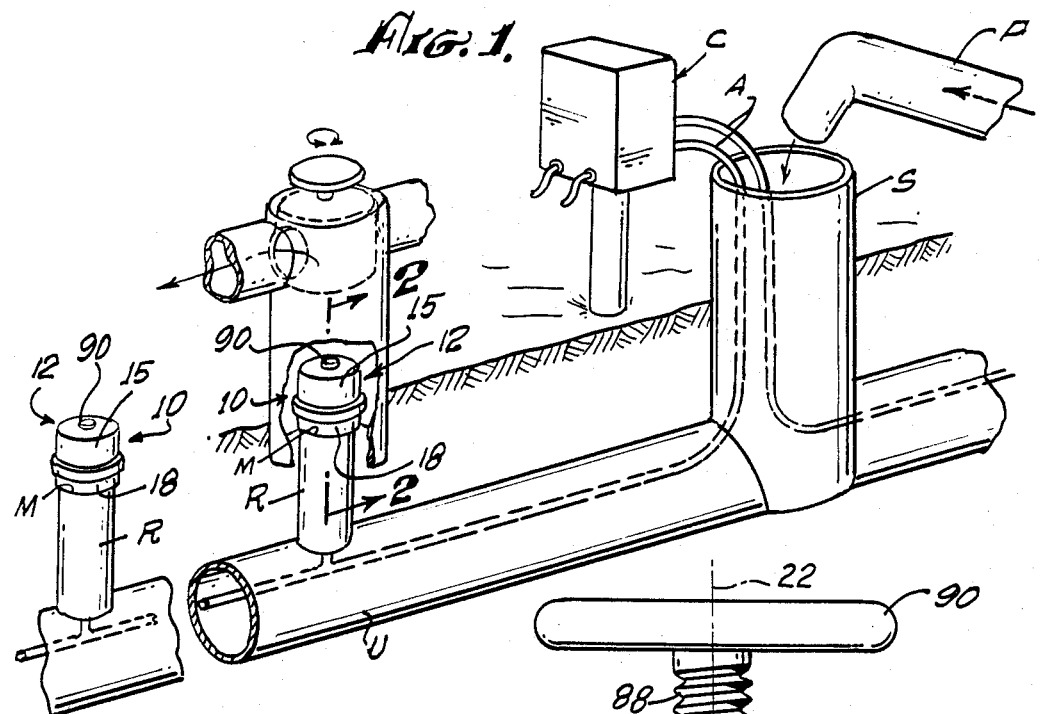
FIG. 1 is a perspective view of the fluid pressure actuated valve of the subject invention shown in a typical operational configuration installed on an irrigation system.

With reference now to the drawings, and initially to FIG. 1 thereof, a fluid pressure actuated valve constructed in accordance with the present invention is indicated generally by the numeral 10 and is shown in a typical operative environment for which it has particular utility. More specifically, the valve 10 is sealably secured in fluid-impeding relation on and about the mouth M of a riser R which is part of an automated agricultural irrigation system.

As illustrated, a filler pipe F directs irrigation water, whether it be ditch water, canal water, well water, or other sources of water, into an elevated standpipe S which extends upwardly from a conduit or water line V. A plurality of risers R are disposed at predetermined spaced intervals along the water line and are adapted to discharge the irrigation water onto a contiguous field at predetermined times and in selected volumes in accordance with accepted agricultural practices.

A control box C is mounted at a suitable position relative to the standpipe S and the conduit V and, of course, is interconnected to a power supply, not shown. It should be understood that the control box, which may be computer manipulated, mounts a timing subassembly which is capable of selectively metering a supply of pressurized fluid, not shown, and in this case air, at predetermined timed intervals to the fluid pressure actuated valve 10 of the subject invention. The air source may be of any well known type, including a compressor, which is capable of generating sufficient air pressure to render the fluid pressure actuated valve operable upon command.

Air lines A are connected in fluid-flow relation with the control box C and are slidably received into the standpipe S and extend therethrough the conduit V. The air lines A of course are protected from damage or deterioration from the vagaries of dust, dirt, curious beasts, accidental damage or severance by inattentive farm hands and, of course, vandals. It should be appreciated that the precise location of the air lines may be dictated by several other extrinsic factors which make the location suggested above less desirable. However, and where possible, the protection afforded by internally threading the air lines in the water lines V has distinct advantages. The air lines are connected in fluid-flow relation to each of several valves 10 which are disposed in fluid impeding relation on the risers R and are preferably interconnected in parallel relation for purposes of maintaining uniformity of air pressure throughout the system.

Figure 2:
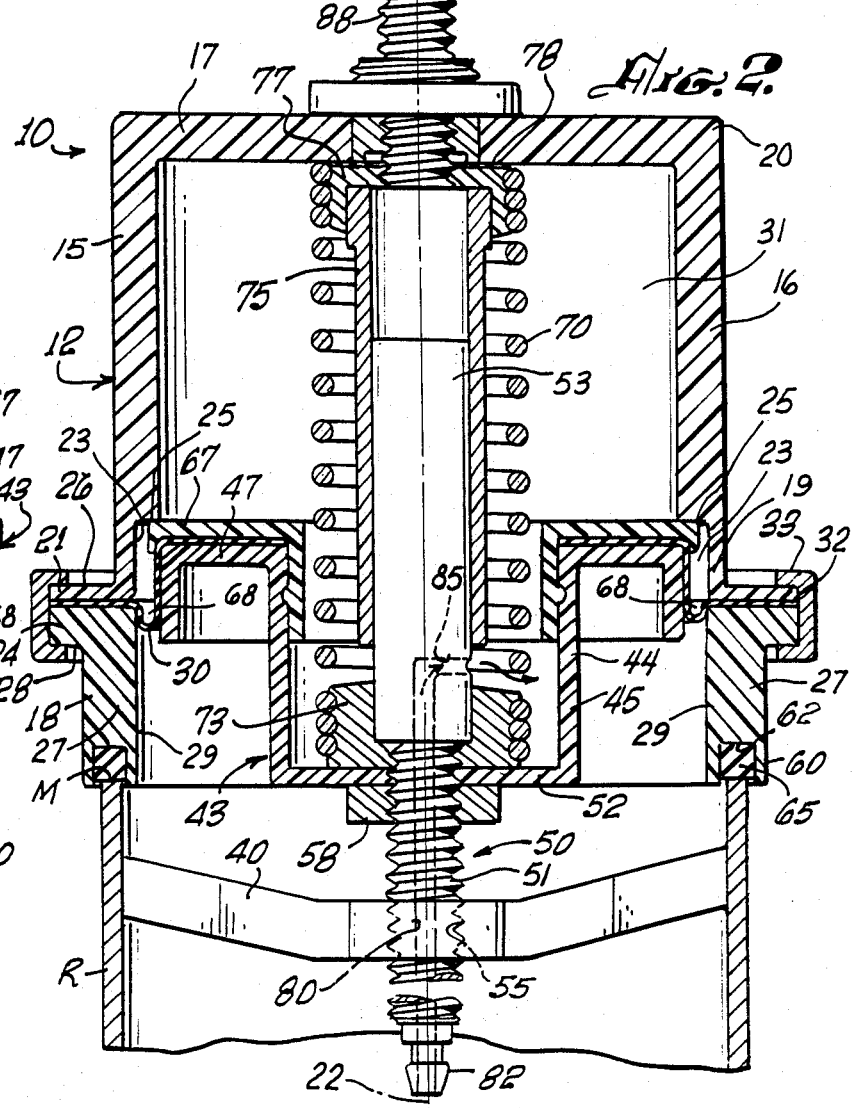
FIG. 2 is a partial somewhat enlarged longitudinal sectional view of one form of a valve constructed in accordance with the present invention taken from a position indicated by line 2—2 of FIG. 1.
Figure 3:
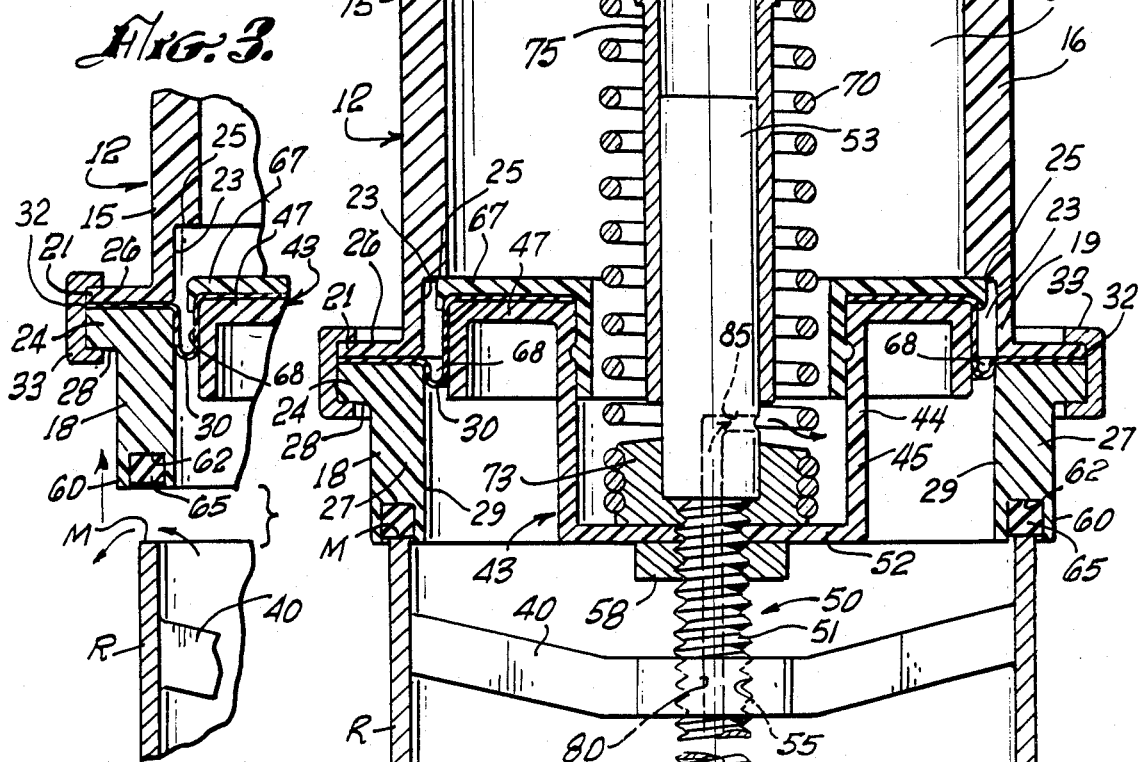
FIG. 3 is a second, somewhat enlarged partial longitudinal section of the valve of FIG. 2 and illustrating the valve body of the instant invention in a raised position which permits water to be discharged from the riser.

With particular reference now to FIG. 2, and when appropriate, FIG. 3, a valve body generally indicated by the numeral 12 is illustrated in the somewhat enlarged longitudinal sectional view of FIG. 2 as having an upper, cup shaped portion 15 and a lower, cylindrical shaped portion 18. The upper, cup shaped portion has a substantially unitary side wall 16, a top surface 17, a first end 19, and a second end 20. Furthermore, the cup shaped portion has a longitudinal axis generally indicated by the line labeled 22. The side wall 16 has formed about its first end 19 a recessed portion 23. The recessed portion defines a supporting surface 25. The lower cylindrical shaped portion 18 similarly has a side wall 27 which defines an inside surface 29. The upper and lower portions 15 and 18, respectively, are joined at their terminus 21 and 24, which are illustrated in FIG. 2 as being flanged about the circumference thereof so as to present flat facing surfaces 26 and 28, respectively.

A fluid tight or impermeable chamber 31 is defined within the confines of the upper cup shaped portion 15, by a fluid impermeable membrane or seal such as a diaphragm 30. The diaphragm 30 is mounted and clamped at its peripheral edge 32 between the flat facing surfaces 26 and 28 of the upper cup shaped portion 15 and the lower cylindrical shaped portion 18. The flat facing surfaces are secured together in sealably secure clamping relationship by some suitable means such as a flange retainer 33. It will be appreciated that the use of other fasteners about the periphery may obviate the use of a flange clamp while maintaining a proper pressure seal. Yet another alternative is the use of a diaphragm having a circumferential bead (not specifically shown). Such a diaphragm is accommodated, in a known manner by forming a circumscribing groove in one or both of the flat facing surfaces 26 and 28, into which said circumferential bead is mounted in sealably secure relation.

Certainly, any other suitable means of securing the upper and lower portions 15 and 18, respectively, together at their respective termini 21 and 24 in fluid sealing relation would be acceptable and would not constitute a departure from the present invention. Indeed, and as will be appreciated, the use of a two piece body greatly facilitates assembly and maintenance of the valve 10. Of course, a unitary valve body 12 would be operative so long as the peripheral edge 32 of the diaphragm 30 could be sealably secured in mating relation therein.

One of the highly utilitarian features of the present invention is that it is mounted in fluid impeding relation on, and anchored directly to, the mouth M of the riser R. This aspect of the invention is accomplished by mounting a valve retaining device such as a webbed member, or spider, 40 in secure mating relation within the riser R at some convenient point below the opening of the mouth M. The spider 40 is screw-threadably adapted to receive a mounting rod which will hereinafter be described in greater detail. The valve body 12 is dimensioned slidably to receive a base member or pedestal 43 which is disposed in substantial coaxial alignment with the longitudinal axis 22 of the valve body. The pedestal has formed therein a vertically disposed recess 44 which is defined by side walls 45, and a bottom wall 52. Mounted to the walls 45 and disposed in laterally extending circumferential relation therewith is a ring or plate 47. A vertically depending rigid support member comprising a threaded axially depending mounting rod 50 extends therethrough the wall 52 defining the base of the pedestal 43 and is screw-threadably received into a threaded aperture 55 formed substantially centrally of the spider 40. The threaded mounting rod further has a threaded first end 51 and a substantially cylindrically shaped second end 53 which is slidably received in telescoping relation internally of a tubular member or guide which will hereinafter be discussed in greater detail. A lock nut 58, or any other suitable fastener means, is employed to secure the threaded mounting rod 50 to the wall 52 of the pedestal 43 so that the entire valve 10 may be screwed into sealable fluid impeding relation with the mouth M of the riser R. In order to establish a proper seal between the lower cylindrical shaped portion 18 and the mouth M, the sealing end 60 of the lower cylindrical shaped portion 18 has formed therein an annulus 62 which is adapted to receive an appropriate seal 65 of elastic type material.

In operation, the valve body 12 will reciprocate relative to the pedestal 43 in response to the application of fluid pressure from the control box C. In order to obtain maximum efficiency from the diaphragm 30, it is best to clamp the center portion thereof in such a manner that its movement is minimized. To this end, the central portion of the diaphragm 30 is secured by a clamp ring 67 thereagainst the lateral extending circumferential ring 47 of the pedestal 43. The clamp ring is operable to pinch the inner circumferential surface of the diaphragm 30 therebetween the pedestal and the clamping ring. The clamping ring is secured to the pedestal by any suitable known fastening means thereby sealably to secure the diaphragm 30 across the full width of the pedestal 43.

It will be observed by a close study of FIGS. 2 and 3 that the radius dimension of the pedestal 43 is slightly less than the inner diameter dimension of the recessed portion 23 of the valve body 12 such that the outer circumferential edge of the plate 47 is disposed in predetermined spaced relation from the inside surface 29 of the valve body by a distance which is appropriate to accommodate the design of the diaphragm 30 being employed. Such a distance or space 68 is preferably slightly greater than twice the thickness of the diaphragm itself. The diametral difference is such that the diaphragm 30 spans the short space 68 to complete the seal, and as the valve body 12 moves under the effects of operating fluid pressure relative to the pedestal 43, rubbing and friction between the valve body 12 and the pedestal is substantially eliminated. In a typical valve 10, for example, the space 68 between the cylindrical wall and the outer circumferential surface of the plate 47 is greater than twice the thickness of the diaphragm itself, or up to a maximum dimension of 0.250 inches for valves which range in size between two inches and 12 inches, which are typically the size contemplated by the present invention. Since the diaphragm 30 neither abrades nor rubs against either the inside surface 29 or pedestal 43 but rather merely rolls upon itself or upon the inside surface 29, the result is low maintenance, high durability and increased reliability, all of which enhances the value of the valve 10 to the farmer. Furthermore, the same small diametral difference, as previously discussed, permits the use of biasing springs of significantly smaller size than would otherwise be anticipated since a relatively small ring-shaped portion of the diaphragm 30 is exposed to the water pressure present in the riser R. The biasing spring of the subject apparatus will hereinafter be discussed in greater detail.

For safety as well as economic reasons, the valve 10 of the subject invention is adapted to remain in a normally closed first position when not in use. This is best illustrated by reference to FIG. 2. This may be accomplished by utilizing a suitable resilient holding means such as a biasing spring 70.

The biasing spring 70 is secured to a first retainer 73 which is mounted to the pedestal 43. The biasing spring is further slidably disposed on and about a tubular member or guide 75 in substantial coaxial alignment with the threaded mounting rod 50. A second retainer 77 secures the opposite end of the biasing spring 70 to the upper, cup shaped portion 15 of the valve body 12. Sealing devices such as gaskets 78 may be employed to maintain the integrity of the fluid impermeable chamber 31. The biasing spring 70 has sufficient strength to cause the valve body 12 to be urged into a sealably secure fluid impeding relationship with the mouth M of the riser R. Force exerted by the biasing spring 70 may be varied by rotating the valve body 12, and more particularly the threaded mounting rod 50 to adjust the distance the threaded mounting rod 50 extends into the threaded aperture 55 formed in the spider 40. The same action is utilized to preset the distance above the mouth of the riser to which the valve body 12 will move when urged into its open position which is best illustrated by reference to FIG. 3.

As a further feature of the invention, low pressure fluid, typically, although not necessarily, air, may be introduced into the upper cup shaped portion 15 to actuate the valve 10 to move to the open position. Introduction of air under pressure to the upper cup shaped portion 15 may be accomplished in one of several ways. As best seen by reference to FIG. 2, the mounting rod 50 has formed substantially centrally thereof a coaxially aligned bore 80 which terminates in a nipple 82 to which the air line A may be attached. The bore 80 is vented into the fluid impermeable chamber 31 defined between the diaphragm 30 and the upper cup shaped portion 15 at some suitable point such as illustrated at 85. The introduction of air under a predetermined pressure will result in a force sufficient to urge the valve body 12 to lift against the tension of the biasing spring 70. This is best illustrated by reference to FIG. 3. As a result, water in the riser R is discharged and passes between the sealing end 60 of the valve body 12.

In order to facilitate manual operation, the valve 10 mounts a screw 88 which is adapted to be rotated with a key 90. The screw 88, of course, manually lifts the valve body 12. Accordingly, an unexpected malfunction in the control box C is not fatal to the valve's 10 operation.

A close study of FIGS. 2 and 3 will reveal that only a small portion of the valve body 12 is subjected to water head pressure, that being the width of the diaphragm 30 which spans the space 68 between the valve body 12 and the peripheral edge of the laterally extending circumferential plate 47 of the pedestal 43. As heretofore discussed, the area of this space 68 is such that force generated by the irrigation water pressure acting against the exposed portion of the diaphragm 30 and in a direction which would tend to open the valve 10 is quite small. As should be understood, this makes it possible to use a much smaller biasing spring 70 than might otherwise be required to hold the valve 10 closed against such water pressure. As the valve body 12 is urged into an open position, it will be seen that the diaphragm 30 will "roll" along the inside surface 29 of the lower cylindrical shaped portion 18. The use of a rolling type diaphragm, though well known, is distinctive in its application here because it must withstand pressure reversal; that is, the diaphragm must withstand the irrigation water pressure. Though not designed for use in situations of pressure reversal, the diaphragm 30 of the present invention may be used herein because of the relatively low water pressures employed in flood irrigation systems. It will also be appreciated that the diaphragm 30 by virtue of its position within the valve body 12 is not exposed to destructive atmospheric and environmental elements, and only a very small portion of it is subjected to water, thereby ensuring longevity and repeated trouble free operation.

SECOND FORM

As best illustrated by reference to FIG. 4, a valve 100 is shown which has a substantially lower profile valve body 112 and an upper, dome shape valve portion 115. The dome shaped valve portion is defined by a substantially vertically disposed unitary side wall 116 which is interconnected with a top surface 117. The dome shaped valve portion further has a first end 119 and a second end 120. A mating lower cylindrical cup shaped valve portion 118 is also provided. The cup shaped valve portion 118 is defined by a substantially unitary side wall 122 which is interconnected to a bottom surface or end plate 153. As in the case of the first form of the subject invention, the upper and lower termini 121 and 124 of the dome shaped valve portion 115 and the cup shaped valve portion 118 are flanged at 125 and 127, respectively. The flanges 125 and 127 define upper and lower mating surfaces 126 and 128 between which is sandwiched the outer peripheral edge 132 of the diaphragm 130. The dome shaped valve portion and the cup shaped valve portion are secured together by means of a fastener 133 in a well known manner. The diaphragm 130, the side walls 116, and the top surface 117 define a fluid impermeable chamber 131 which operates in a manner identical to the fluid impermeable chamber 31 which was discussed heretofore in the first form of the invention.

The valve 100 is likewise adapted to be screw-threadably secured in fluid impeding relation to the mouth M of the riser R by employing a spider, not shown, or some other means of attachment. Similarly, the valve 100 mounts a base member or pedestal 143 which is screw-threadably adapted to receive a mounting rod 150 which is suitably affixed to the spider.

The cup shaped valve portion 118 has formed substantially centrally of the end plate 153 an opening 154 through which the mounting rod 150 protrudes. The end plate 153 may be likewise formed with one or more orifices 156 through which water in the riser R may easily enter and leave the lower chamber 151 which is formed by the diaphragm 130 and the cup shaped valve portion 118.

In order sealably to secure the diaphragm 130 internally of the valve 100, an annular clamp 167 is mounted on the upper surface of the base member 143 where it is preferably affixed in place by a locking nut 168 which is screw-threadably secured to the mounting rod 150. A biasing spring 170 is slidably received on and about the mounting rod 150 and is disposed therebetween the base member 143 and the end plate 153 of the cup shaped valve portion 118. In order to secure the biasing spring in an appropriate attitude, a retaining boss 173 is formed on the end plate 153.

In order to effect proper sealing of the riser R when the valve 10 is disposed in its normally closed position, the end plate 153 has formed therein an annulus 162 which is conformably dimensioned to receive a sealing member 165 in fitted receipt therewith.

In a manner similar to that described with respect to the first form of the invention, the valve 100 is manually preset to open by a predetermined amount by rotating the valve body 112. The rotation of valve body 112 of course, screw-threadably urges the mounting screw 150 to a desired depth with respect to the spider, not shown, in the riser R. The valve 100 must be actuated to accomplish this adjustment. Actuating fluid may be introduced through a port 183 which is formed in the top surface 117, or in the manner heretofore described with respect to the first form of the invention.

THIRD FORM

As best seen by reference to FIG. 5, a valve 200 includes a valve body 212 which has an upper, cup shaped valve portion 215 and a lower, cylindrically shaped valve portion 218. As in the previous configurations, the upper and lower valve portions 215 and 218, respectively are affixed together by suitable fastener means at the flanged termini 221 and 224, respectively.

The valve 200 mounts a base or pedestal 243 which is secured in predetermined fixed spaced relation with respect to a spider 240 which is mounted in the riser R by a positioning tube generally indicated by the numeral 244. An annular shaped clamp 267 secures the inner peripheral portion of the diaphragm 230 thereby sealably securing the diaphragm to the pedestal and also forming distinct chambers 231 and 233, respectively, above and below the diaphragm 230.

The valve 200, like the valve 100, is configured so as to present a low profile design. However, by mounting the biasing spring 270 below the spider 240 an even lower profile is achievable. A further advantage to the third form of the subject invention is the ability to use larger and thus stronger biasing springs which, when disposed well into the riser R, do not affect the exposed height of the valve 200.

Thus, the valve 200 includes a biasing spring 270 which is disposed in depending relation from a spring retainer 273 which is affixed to the underside of the spider 240. The biasing spring has a lower end 274 which is slidably received in mating relation thereagainst a limit tube 275. An adjustment rod 276 is affixed to the end of the limiting tube 275 and extends upwardly in telescoping relation through the positioning tube 244 and therethrough an opening 279 formed in the upper valve portion 215. A wing nut 281 secures the adjustment rod 276 to the top thereof. The wind nut, of course, permits the adjustment of the length of the rod 276. Air pressure is introduced into the chamber 231 through a nipple valve arrangement 282 which is sealably mounted to the base member 243. The air line A, as illustrated, enters the riser R through a sealed grommet 285. Alternatively, it should be understood that the air line A could extend through the riser R as best illustrated in FIG. 1.

Upon introduction of air pressure through the air line A and into the chamber 231 defined therebetween the diaphragm 230 and the upper valve portion 215, the air pressure urges the valve body 212 to move upwardly thereby compressing the biasing spring 270 and causing the riser R to open. The amount of opening is determined by the length of the rod 276 and by the length of the limiting tube 275, which will eventually abut against the spring retainer 273 thereby stopping any further movement of the valve body 212.

Again, and as discussed in the previous configurations, the lower valve portion 218 has a sealing end 260 which has formed therein an annulus 262 which is conformably dimensioned to receive a seal 265 in interfitted receipt therewith. The seal 265, of course, sealably secures the valve 200 thereagainst the mouth M of the riser R when the valve is disposed in its normally closed first position which is best seen by reference to FIG. 5.

The valves 10, 100, and 200 of the present invention may be adapted for use on existing, as well as new, irrigation systems. Where the irrigation system is preexisting, however, there may be problems encountered. For example, the riser R to which the valves are typically affixed may be of insufficient depth to permit the use of the proper length biasing spring as for example the valve 200 as shown in FIG. 5. Under other circumstances, for example, the mouth M of the risers R upon which the valves 10, 100 and 200 sits may be rough due to corrosion, for example, such that an adequate seal is impossible, without the use of excessively strong biasing springs.

To alleviate the above-identified adverse field conditions, such as those described, the invention contemplates the use of an alternate sealing arrangement, either alone or in combination with a height extending means such as a sleeve which is generally indicated by the numeral 310, and is best seen by reference to FIGS. 6 and 7. In order to make the sleeve as uniform an extension of the riser R as possible, the mouth M of the riser R is preferably bonded at its inner surface 315 to the face 317 of the sleeve 310. It will be appreciated, however, that other means of sealably securing the sleeve to the riser R may be employed without departing from the teachings of the instant invention. A flange 320 is mounted to the sleeve 310 and extends laterally and circumferentially about the sleeve at a predetermined distance from the upper end 311 thereof to provide a shelf 312 upon which any of the several valves 10, 100, or 200 of the present invention may be mounted. The height of the sleeve, of course, can be varied to provide such additional riser R height as may be required, thereby permitting the use of such a biasing spring 270 length as may be necessary to render the third form of the invention operable.

With specific reference to FIG. 6, it will be understood that the surface 325 of the sleeve 310 has been made relatively smooth. By so doing, it is possible to provide an alternate sealing arrangement which is more commonly referred to as a lip seal, between a valve 10, 100 or 200 of the present invention and the sleeve 310. Such an arrangement which is best seen by reference to FIG. 7, requires less biasing spring pressure to effect sealing, and thus the size of the biasing spring can be reduced. While the sealing arrangement is illustrated with respect to a riser R, it will be apparent that a lip seal may also be utilized on a riser R which has a sufficiently smooth exterior surface.

As best seen by reference to FIG. 7, a lip seal 330 is mounted in a seat or groove 332 which is formed in the valve 200. The lip seal 330 has a lip portion 335 which protrudes or extends inwardly from the groove towards the surface 325 which is defined by the sleeve 310. The purpose served by the lip seal 330 is substantially identical to that served by the seal 62 and its companion parts 162 and 262 in the second and third forms of the subject invention 100 and 200, respectively. Moreover, the utilization of a lip seal 330 may also permit the valves 10, 100, or 200 to be seated more deeply into the riser R where such an arrangement is deemed advisable or desirable. It should be appreciated, therefore, that use of the sleeve 310 is as herein described, overcomes two major problems experienced in the field.

Although the invention has been herein shown and described in what is conceived to be the most practical and preferred embodiment, it is recognized that departures may be made therefrom within the scope of the invention which is not to be limited to the illustrative details disclosed.

Having set forth a preferred and certain alternative embodiments in significant detail, what is claimed is:

1. A fluid pressure actuated valve adapted to be seated in sealing relation about the mouth of a pipe in normally fluid sealing relation thereto comprising:
    a movable valve body having an upper portion and a lower portion, said upper and lower portions being joined at their respective circumferential edges and defining an interior region;
    a pedestal, a threaded axially depending mounting rod affixed on said pedestal and secured within said pipe, the pedestal and threaded axially depending mounting rod operable to secure said valve body in its normally seated position about the mouth of said pipe;
    means forming a fluid impermeable flexible seal secured at its peripheral edge between said upper and lower portions, a portion of said seal being secured on said pedestal;
    means for resiliently holding said valve body in fluid sealing relation against the pipe; and
    means for delivery of fluid under pressure to said interior region of the upper portion of the valve body so as to act against the resilient means to unseat said valve body against the action of said resilient means and urging it to an unseated position above the mouth of the pipe.

2. The valve as set forth in claim 1 wherein the pedestal is disposed within said valve body and has a diameter less than the inside diameter of said valve body.

3. The valve as set forth in claim 2 wherein:
    the space between the inner wall of said valve body and the circumferential surface of said pedestal is greater than twice the thickness of said seal.

4. The valve as set forth in claim 1 wherein said resilient means comprises a biasing spring acting between said pedestal and said valve body.

5. The valve as set forth in claim 4 wherein a retaining device is rigidly affixed on said pipe and has an aperture therein for receiving said mounting rod, the permitted travel of said biasing spring determined by the depth to which said mounting rod is inserted into said aperture to thereby control the height above the mouth of said pipe to which said valve can open.

6. The valve as set forth in claim 3 wherein the means forming the fluid impermeable flexible seal is a diaphragm, and a portion of the diaphragm spanning the space between the valve body and the circumferential edge of the pedestal roll upon itself as said valve body is moved under fluid pressure between the seated fluid sealing position and the unseated position.

7. The valve as set forth in claim 1 wherein said resilient means is contained wholly outside said valve body.

8. The valve as set forth in claim 1 wherein the threaded axially depending mounting rod has a threaded first end and a substantially cylindrically shaped second end, the mounting rod having formed therein a bore, and fluid pressure is directed to said valve body through said bore.

9. The valve as set forth in claim 5, wherein said valve body is liftable from its seated position and rotatable to urge the mounting rod to a predetermined depth within the pipe to adjust the height to which said valve can rise above the mouth of said pipe.

10. The valve as set forth in claim 3, wherein: said space is no greater than 0.250 inches.

11. The valve of claim 1 wherein the fluid under pressure is delivered to the interior region of the valve body through the upper portion thereof.

12. The valve of claim 1 wherein the fluid under pressure is delivered to the interior region of the valve body through the pedestal thereof.

13. A fluid pressure actuated valve operable selectively to occlude the mouth of a riser, the valve comprising:
    a valve body operable to move along a path of travel between a closed position and an opened position;
    a mounting rod adapted releasably to be secured internally of the riser and mounting a pedestal slidably received within the valve body;
    a diaphragm mounted internally of the valve body interconnecting the valve body and the pedestal in fluid sealing relation to define a substantially fluid tight chamber internally of the valve body;
    a spring borne by the valve operable resiliently to hold the valve body in the closed position; and
    means for selectively delivering a fluid under pressure to the fluid tight chamber to urge the valve body to move along the path of travel from the closed position to the opened position to achieve the selective opening of the riser.

* * * * *

UNITED STATES PATENT AND TRADEMARK OFFICE
CERTIFICATE OF CORRECTION

PATENT NO. : 4,733,689

DATED : March 29, 1988

INVENTOR(S) : Lee Osnas

It is certified that error appears in the above-identified patent and that said Letters Patent are hereby corrected as shown below:

Column 12, line 5, delete "roll" and substitute ---rolls---.

Signed and Sealed this

Nineteenth Day of July, 1988

Attest:

DONALD J. QUIGG

*Attesting Officer*     *Commissioner of Patents and Trademarks*